(12) United States Patent
Hirschfeld et al.

(10) Patent No.: US 10,681,103 B2
(45) Date of Patent: Jun. 9, 2020

(54) SOCIAL NETWORKING WITH VIDEO ANNOTATION

(71) Applicant: Art Research and Technology, L.L.C., Phoenix, AZ (US)

(72) Inventors: David Hirschfeld, Scottsdale, AZ (US); Barry Fernando, Phoenix, AZ (US); Mark C. Phelps, Phoenix, AZ (US); Theodore V. Haig, Phoenix, AZ (US)

(73) Assignee: Art Research and Technology, L.L.C., Phoenix, AZ (US)

( * ) Notice: Subject to any disclaimer, the term of this patent is extended or adjusted under 35 U.S.C. 154(b) by 0 days.

(21) Appl. No.: 16/134,541

(22) Filed: Sep. 18, 2018

(65) Prior Publication Data

US 2019/0020703 A1    Jan. 17, 2019

Related U.S. Application Data

(60) Division of application No. 15/269,879, filed on Sep. 19, 2016, now Pat. No. 10,084,840, which is a continuation-in-part of application No. 14/170,149, filed on Jan. 31, 2014, now Pat. No. 9,451,001.

(60) Provisional application No. 61/759,219, filed on Jan. 31, 2013.

(51) Int. Cl.
| *H04L 29/06* | (2006.01) |
| *H04L 29/08* | (2006.01) |
| *H04L 12/58* | (2006.01) |
| *G06Q 50/00* | (2012.01) |
| *H04L 12/18* | (2006.01) |

(52) U.S. Cl.
CPC ........... *H04L 65/602* (2013.01); *G06Q 50/01* (2013.01); *H04L 12/1818* (2013.01); *H04L 51/16* (2013.01); *H04L 51/32* (2013.01); *H04L 65/403* (2013.01); *H04L 65/607* (2013.01); *H04L 67/10* (2013.01); *H04L 67/02* (2013.01); *H04L 67/306* (2013.01); *H04L 67/42* (2013.01)

(58) Field of Classification Search
None
See application file for complete search history.

(56) References Cited

U.S. PATENT DOCUMENTS

| 6,687,878 B1 | 2/2004 | Eintracht et al. |
| 8,533,598 B2 | 9/2013 | Meaney et al. |
| 9,451,001 B2 | 9/2016 | Hirschfeld et al. |
| 9,767,087 B1 | 9/2017 | Petrov |
| 9,867,011 B2 | 1/2018 | Kulikov |

(Continued)

FOREIGN PATENT DOCUMENTS

| JP | 2009199500 A | 9/2009 |
| KR | 20100071359 A | 6/2010 |
| KR | 20110136308 A | 12/2011 |

OTHER PUBLICATIONS

International Preliminary Report on Patentability and Written Opinion, issue in related International Patent Application No. PCT/US2014/014238, dated Mar. 31, 2014, 5 pages.

*Primary Examiner* — Brian Whipple
(74) *Attorney, Agent, or Firm* — Quarles & Brady LLP

(57) ABSTRACT

A method and system for annotating Playable Media Files in a social network having a plurality of members, wherein the method includes receiving the Playable Media File from a first member, receiving an annotation from another member, and saving the annotation in a file other than the Playable Media File.

24 Claims, 14 Drawing Sheets

(56) References Cited

U.S. PATENT DOCUMENTS

| | | |
|---|---|---|
| 2009/0248833 A1 | 10/2009 | Frazier |
| 2010/0251386 A1 | 9/2010 | Gilzean et al. |
| 2010/0278504 A1* | 11/2010 | Lyons .................. G06F 3/0481 386/278 |
| 2010/0287475 A1 | 11/2010 | van Zwol et al. |
| 2011/0063317 A1 | 3/2011 | Gharaat et al. |
| 2012/0151320 A1 | 6/2012 | McClements, IV |
| 2012/0151346 A1 | 6/2012 | McClements, IV |
| 2012/0159329 A1 | 6/2012 | Chow et al. |
| 2012/0284343 A1 | 11/2012 | Lee et al. |
| 2012/0317210 A1 | 12/2012 | Fisher et al. |
| 2013/0046761 A1 | 2/2013 | Söderberg et al. |
| 2014/0075317 A1 | 3/2014 | Dugan et al. |
| 2014/0172848 A1 | 6/2014 | Koukoumidis et al. |
| 2014/0214966 A1 | 7/2014 | Hirschfeld et al. |
| 2014/0229866 A1 | 8/2014 | Gottlieb |
| 2016/0353245 A1 | 12/2016 | Kulikov |
| 2017/0013042 A1 | 1/2017 | Hirschfeld et al. |

* cited by examiner

SOCIAL NETWORKING WITH VIDEO ANNOTATION

CROSS-REFERENCE TO RELATED APPLICATIONS

This is a divisional of U.S. patent application Ser. No. 15/269,879 entitled "SOCIAL NETWORKING WITH VIDEO ANNOTATION" and filed on Sep. 19, 2016, which is a Continuation-In-Part patent application of a United States Non-Provisional patent application having Ser. No. 14/170,149, filed on Jan. 31, 2104, now U.S. Pat. No. 9,451,001, which claimed priority to United States Provisional patent application having Ser. No. 61/759,219, filed on Jan. 31, 2013. The disclosure of each of the above-identified patent documents is incorporated herein by reference in its entirety.

FIELD OF THE INVENTION

Embodiments generally relate to assemblies, methods, devices, and systems for managing information, and more particularly, to assemblies, methods, devices, and systems for sharing and annotating video data between members of a social network.

SUMMARY OF THE INVENTION

A method to create and save an annotation associated with a Playable Media File is disclosed. The method includes receiving a Playable Media File, creating an annotation relating to the Playable Media File, providing the annotation to a network server, providing a data profile to the network server, wherein the data profile comprises a location in the Playable Media File where the annotation should be made visible, determining by the network server if the annotation is a first annotation submitted for the Playable media File, if the annotation is not a first annotation submitted for the Playable Media File, encoding the data profile in a previously-created table of contents for the Playable Media File, if the annotation is a first annotation submitted for the Playable Media File, then creating a table of contents by the network server for the Playable Media File and encoding by the network server the data profile in the table of contents, wherein the Playable Media File is selected from the group consisting of an audio file, a video file, an audiovisual file, slide show, AVI file, MP3 file, MP4 file, WMA file, WAV file, FLASH, and MPEG file.

An article of manufacture is disclosed. Applicants' article of manufacture comprises a processor, a computer readable medium comprising computer readable program code disposed therein to create and save an annotation associated with a Playable Media File, the computer readable program code comprising a series of computer readable program steps to cause the processor to effect receiving a Playable Media File, creating an annotation relating to the Playable Media File, providing the annotation to a network server, providing a data profile to the network server, wherein the data profile comprises a location in the Playable Media File where the annotation should be made visible, determining by the network server if the annotation is a first annotation submitted for the Playable media File, if the annotation is not a first annotation submitted for the Playable Media File, encoding the data profile in a previously-created table of contents for the Playable Media File, if the annotation is a first annotation submitted for the Playable Media File, then creating a table of contents by the network server for the Playable Media File and encoding by the network server the data profile in the table of contents, wherein the Playable Media File is selected from the group consisting of an audio file, a video file, an audiovisual file, slide show, AVI file, MP3 file, MP4 file, WMA file, WAV file, FLASH, and MPEG file.

A non-transitory computer usable medium encoded with a computer program product to create and save an annotation associated with a Playable Media File and usable with programmable computer processor disposed within a controller, is disclosed. Applicants' computer program product comprises computer readable program code which causes the programmable computer processor to receive a Playable Media File, create an annotation relating to the Playable Media File, provide the annotation to a network server, provide a data profile to the network server, wherein the data profile comprises a location in the Playable Media File where the annotation should be made visible, determine by the network server if the annotation is a first annotation submitted for the Playable media File, if the annotation is not a first annotation submitted for the Playable Media File, encode the data profile in a previously-created table of contents for the Playable Media File, if the annotation is a first annotation submitted for the Playable Media File, then create a table of contents by the network server for the Playable Media File and encode by the network server the data profile in the table of contents, wherein the Playable Media File is selected from the group consisting of an audio file, a video file, an audiovisual file, slide show, AVI file, MP3 file, MP4 file, WMA file, WAV file, FLASH, and MPEG file.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF PREFERRED EMBODIMENTS

Figure 1:
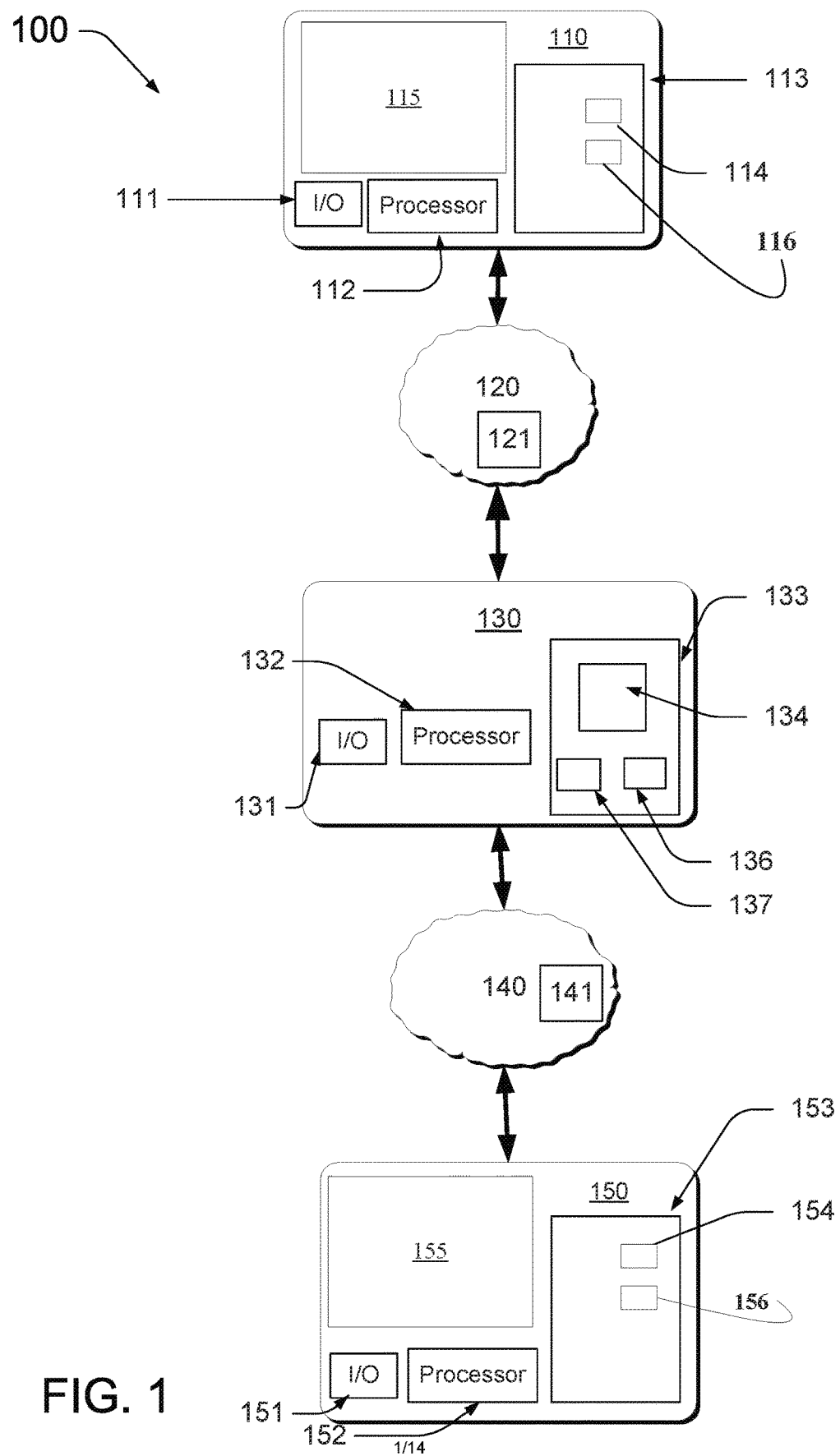
FIG. 1 illustrates an exemplary embodiment of a system for annotating video within a social network.

The invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in certain embodiments," and similar language throughout this specification may, but do not necessarily, all refer to the same embodiment. It is noted that, as used in this description, the singular foing s "a," "an" and "the" include plural referents unless the context clearly dictates otherwise.

The described features, structures, or characteristics of the invention(s) may be combined in any suitable manner in one or more embodiments. In the following description, numerous specific details are recited to provide a thorough understanding of embodiments of the invention(s). One skilled in the relevant art will recognize, however, that the invention(s) may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as a logical flow-chart diagram (e.g., FIGS. 4, 5A, 5B, 6, 7, 8, 9, 10, 11, 12, and 13). As such, the depicted order and labeled steps are indicative of one embodiment of the presented method. In certain embodiments, other steps and methods are conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types are employed in the flow-chart diagrams, they are understood not to limit the scope of the corresponding method (e.g., FIGS. 4, 5A, 5B, 6, 7, 8, 9, 10, 11, 12, and 13). Indeed, some arrows or other connectors may be used to indicate only the logical flow of the method. For instance, an arrow indicates a waiting or monitoring period of unspecified duration between enumerated steps of the depicted method. Additionally, the order in which a particular method occurs may or may not strictly adhere to the order of the corresponding steps shown.

In certain embodiments, individual steps recited in FIGS. 4, 5A, 5B, 6, 7, 8, 9, 10, 11, 12, and 13, are combined, eliminated, or reordered.

Applicants' system and method includes a network wherein a video can be created using any available video format, and that video can be shared between a plurality of people. In certain embodiments, Applicants' system and method can be used by multiple members of a social network to associate annotations with a Playable Media File, and/or to initiate discussion threads associated with that Playable Media File.

Referring to FIG. 1, a portion of Applicants' network 100 is illustrated. In certain embodiments, Applicants' network 100 comprises a social network. In certain embodiments, Applicants' social network 100 is an open social network. In certain embodiments, Applicants' social network 100 is a closed social network.

In the illustrated embodiment of FIG. 1, network 100 comprises a network server 130 that is communicatively connected to a computing device 110 through a first communication fabric 120 and a computing device 150 through a second communication fabric 140. In certain embodiments, the network server 130 is owned and/or operated by a social networking service provider while computing devices 110 and 150 are owned and/or operated by users or members of the social network 100, where a member has a profile containing information about the member stored in information 137 of the social network server 130. In some embodiments, the computing device 110 is owned and operated by a first member and the computing device 150 is owned and operated by a second member.

For the sake of clarity, FIG. 1 shows a first computing device 110, network server 130, and a second computing device 150. FIG. 1 should not be taken as limiting. Rather, in other embodiments any number of entities and corresponding devices can be part of the network 100, and further, although FIG. 1 shows two communication fabrics 120 and 140, in other embodiments, less then, or more than, two communication fabrics are provided in the social network 100. For example, in certain embodiments, the communication fabric 120 and the communication fabric 140 are the same communication fabric.

In certain embodiments, the computing devices 110 and 150 and host 130 are each an article of manufacture. Examples of the article of manufacture include: a server, a mainframe computer, a mobile telephone, a smart telephone, a personal digital assistant, a personal computer, a laptop, a set-top box, an MP3 player, an email enabled device, a tablet computer, a web enabled device, or other special purpose computer each having one or more processors (e.g., a Central Processing Unit, a Graphical Processing Unit, or a microprocessor) that are configured to execute Applicants' API to receive information fields, transmit information fields, store information fields, or perform methods.

By way of illustration and not limitation, FIG. 1 illustrates the computing device 110, the network server 130, and the computing device 150 as each including a processor 112, 132, and 152, respectively, a non-transitory computer readable medium 113, 133, and 153, respectively, having a series of instructions 114, 134, and 154, respectively, encoded therein, an input/output means 111, 131, and 151, respectively, such as a keyboard, a mouse, a stylus, touch screen, a camera, a scanner, or a printer. Computer readable program code 114, 134, and 154 is encoded in non-transitory computer readable media 113, 133, and 153, respectively. Processors 112, 132, and 152 utilize computer readable program code 114, 134, and 154, respectively, to operate computing devices 110, 130, and 150, respectively. In certain embodiments, the computing device 110, 130, and 150 employ hardware and/or software that supports accelerometers, gyroscopes, magnetometers (e.g., solid state compasses) and the like.

Processors 112 and 152 utilize Applicants' Application Program Interfaces (APIs) 116 and 156, respectively, encoded in computer readable media 113 and 153, respectively, to communicate with host 130 and access Applicants' algorithm 136 encoded in computer readable medium 133 to implement Applicants' social network and method described herein. Algorithm 136 comprises Applicants' source code to operate a public or private social network, and when implemented by computing device 110 causes a graphic user interface ("GUI") to be displayed on display screen 115, wherein that GUI comprises and displays a plurality of graphical interactable objects. A member using computing device 110 (or computing device 150) can utilize that GUI to access a logical volume, such as for example and without limitation logical volume 180 (FIG. 2), wherein information specific to that user are encoded in logical volume 180. The member and/or user can further utilize the GUI to access Applicants' social network as described herein.

Processor 132 accesses the computer readable program code 134, encoded on the non-transitory computer readable medium 133, and executes an instruction 136 to electronically communicate with the computing device 110 via the communication fabric 120 or electronically communicate with the computing device 150 via the communication fabric 140. Encoded information 137 includes, for example and without limitation, the data communicated or information fields communicated, e.g., date and time of transmission, frequency of transmission and the like, with any or all of the computing device 110 and the computing device 150. In certain embodiments, information 137 is analyzed and/or mined. In certain embodiments, information 137 is encoded in a plurality of individual logical volumes specific to each member/user.

In certain embodiments, computing devices 110 and 150 further comprise one or more display screens 115 and 155, respectively. In certain embodiments, display screens 115 and 155 comprise an LED display device.

In certain embodiments, the information fields received from the computing device 110 at the network server 130 are exchanged with other computing devices not shown in FIG. 1. For example, information fields received from a social network in which the member has an Internet presence is sent to the social network server 130 and stored at the information 137 in association with a profile of the member. Alternatively, or in combination, the information fields transmitted from the computing device 110 to the social network server 130 is sent to an account of the member within the social network.

In certain embodiments, information 137 is encoded in one or more hard disk drives, tape cartridge libraries, optical disks, combinations thereof, and/or any suitable data storage medium, storing one or more databases, or the components thereof, in a single location or in multiple locations, or as an array such as a Direct Access Storage Device (DASD), redundant array of independent disks (RAID), virtualization device, etc. In certain embodiments, information 137 is structured by a database model, such as a relational model, a hierarchical model, a network model, an entity-relationship model, an object-oriented model, or a combination thereof. For example, in certain embodiments, the information 137 is structured in a relational model that stores a plurality of Identities for each of a plurality of members as attributes in a matrix.

In certain embodiments, the computing devices 110, 130, and 150 include wired and/or wireless communication devices which employ various communication protocols including near field (e.g., "Blue Tooth") and/or far field communication capabilities (e.g., satellite communication or communication to cell sites of a cellular network) that support any number of services such as: telephony, Short Message Service (SMS) for text messaging, Multimedia Messaging Service (MMS) for transfer of photographs and videos, electronic mail (email) access, or Global Positioning System (GPS) service, for example.

As illustrated in FIG. 1, the communication fabrics 120 and 140 each comprise one or more switches 121 and 141, respectively. In certain embodiments, communication fabrics 120 and 140 are the same. In certain embodiments, at least one of the communication fabrics 120 and 140 comprises the Internet, an intranet, an extranet, a storage area network (SAN), a wide area network (WAN), a local area network (LAN), a virtual private network, a satellite communications network, an interactive television network, or any combination of the foregoing. In certain embodiments, at least one of the communication fabrics 120 and 140 contains either or both wired or wireless connections for the transmission of signals including electrical connections, magnetic connections, or a combination thereof. Examples of these types of connections include: radio frequency connections, optical connections, telephone links, a Digital Subscriber Line, or a cable link. Moreover, communication fabrics 120 and 140 utilize any of a variety of communication protocols, such as Transmission Control Protocol/Internet Protocol (TCP/IP), for example.

Figure 2:
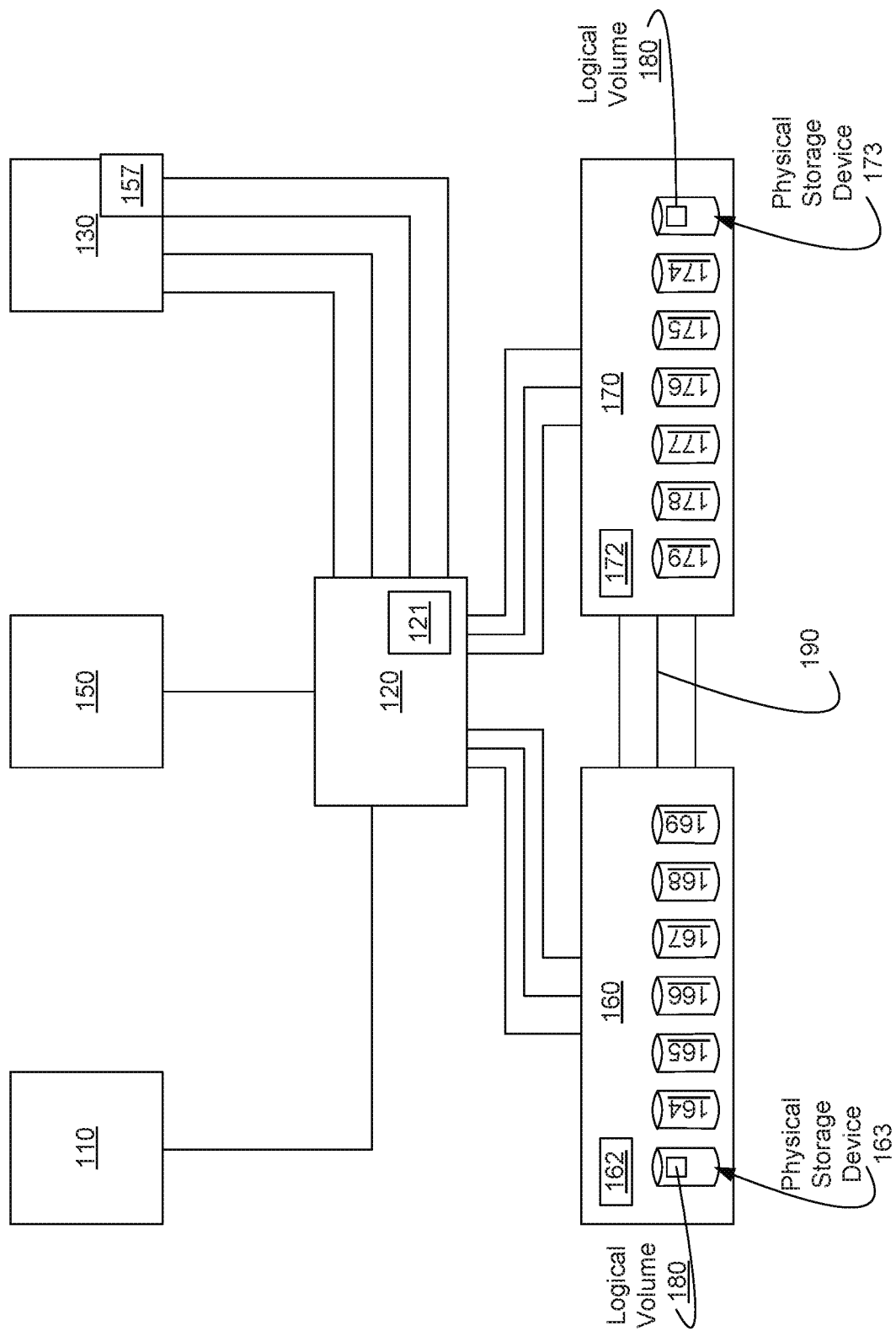
FIG. 2 illustrates another exemplary embodiment of a system for annotating video within a social network.

Referring to FIG. 2, the computing devices 110, 130 and 150 are each communicatively connected to the communication fabric 120, such as a WAN or Internet. The network server 130 is a computing device that is owned and/or operated by a networking service provider, and computing devices 110 and 150 are owned and/or operated by individual network users. In certain embodiments, network server is owned and/or operated by a social network provider. In certain embodiments, the network server 130 provides access to the computing devices 110 and 150 to execute Applicants' source code 136 via a Software as a Service (SaaS) means.

In certain embodiments information fields are received from one or more computing devices 110, 130 and/or 150 and stored on the "Cloud" such as data storage library 160 and/or 170. Referring to FIG. 2, each of the data storage libraries 160 and 170 have corresponding physical storage devices, such as and without limitation physical data storage devices 163-169 for data storage library 160 and 173-179 for data storage library 170.

In certain embodiments, data storage library 160 and data storage library 170 are configured in a Peer To Peer Remote Copy ("PPRC") storage system, wherein the information fields in data storage library 160 is automatically backed up in data storage library 170. In certain embodiments, Applicants' PPRC storage system utilizes synchronous copying. In certain embodiments, Applicants' PPRC storage system utilizes asynchronous copying.

In the illustrated embodiment of FIG. 2, physical storage device 163 is configured to comprise logical volume 180. In certain embodiments, each physical storage device in data storage library 160 is configured to comprise a plurality of logical volumes. Similarly, each physical storage device in data storage library 170 is configured to comprise a corresponding plurality of logical volumes. In certain embodiments, each member of the social network is assigned a unique logical volume. In such embodiments a permission file 157 may be encoded in computer readable medium 133 or in data storage libraries 160 and 170 that associates each logical volume with a social network member and further associates each logical volume with access permissions for certain designated other social network users. Each social network user configures his/her own logical volume permissions. In certain embodiments, if a first user desires to remove access permissions from a second user, that first member simply accesses his/her permissions file and deletes the second user. Thereafter, the second user cannot retrieve data stored on the logical volume associated with the first user.

Figure 3:
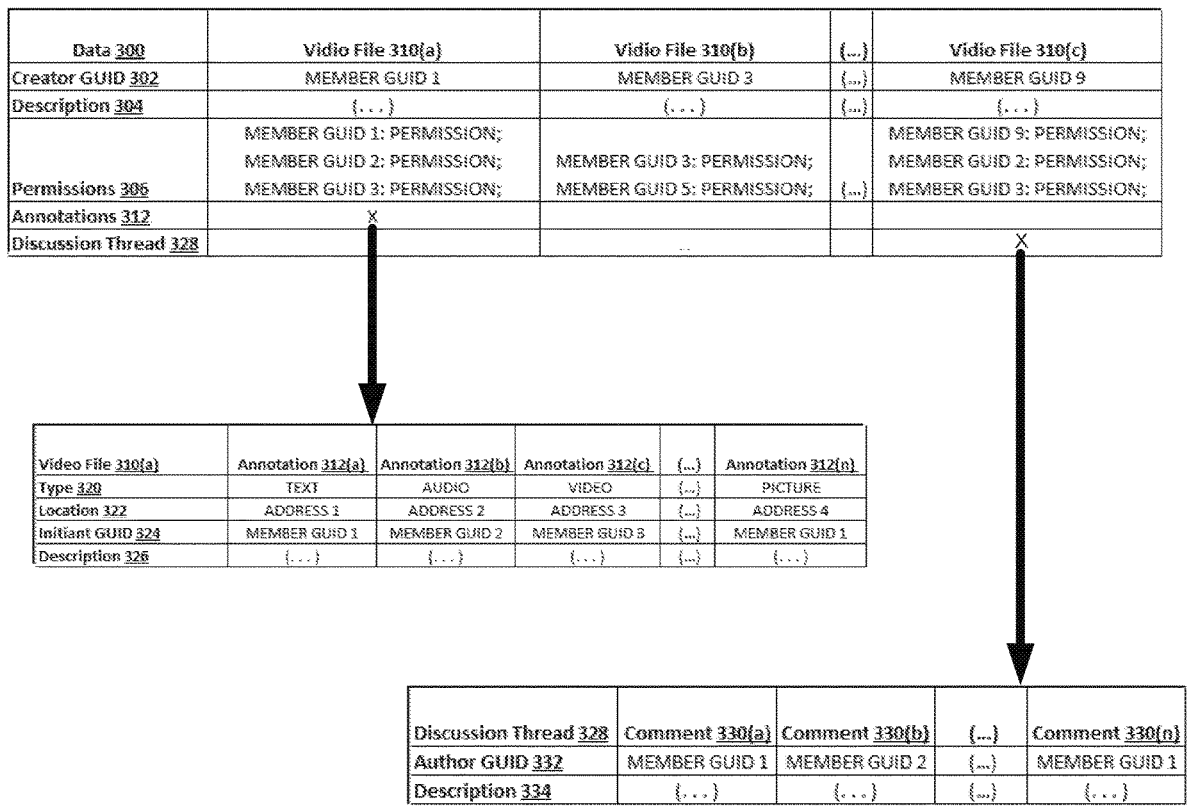
FIG. 3 is a table of information fields stored in association with each Playable Media File.

Referring to FIGS. 1, 2, and 3, Applicants' algorithm 136, and its functions, can be accessed by users of Applicants' network 100 to create, share, edit, associate one or more annotations with, and/or associate one or more discussion threads with, a Playable Media File. One member, using a computing device such as computing device 110 or 150, to access network server 130, streams a Playable Media File from its original storage location. In certain embodiments the Playable Media File is encoded in a unique logical volume accessible by a first user. That first user can grant access to the Playable Media File to one or more other users by storing access permissions in permission file 157. In certain embodiments the access includes levels such as, and without limitation, view only, view/edit, view/edit/share, and the like. In certain embodiments the access includes conditions or restrictions such as expirations dates, limitations on the number of times the file can be viewed, and the like.

Referring now to 3, when a user having permission streams the Playable Media file, and if that user associates an annotation with the Playable Media File, a data profile 300 is created for the Playable Media File and is stored on network server 130, and optionally on data storage library 160 or 170. Data profile 300 includes various information fields, including the Global Unique Identifier (GUID) 302 associated with the creating member, a description 304 of the Playable Media File (e.g., a title), and permissions 306 held by various members to access, edit, and/or share the Playable Media File. Data profile 300 may further include subsequently added annotations 312 and discussion threads 328.

Applicants' algorithm 136 provides the ability for each user having access to the Playable Media File to associate annotations for display at various timeline locations as the Playable Media File is streamed from its original storage location. Such annotations may be any known format and may include text, video, audio, pictures, or a combination thereof, and are stored as a separate file. When subsequent viewers execute the Playable Media File the annotation(s) will be visible at the specified time segment. In certain such embodiments, the annotation is shown in the same window as the Playable Media File and may be visible over the Playable Media File. In other embodiments, the annotation is shown in a separate window. Applicants' algorithm 136 generates a timeline which displays when the Playable Media File is streamed.

Figure 4:
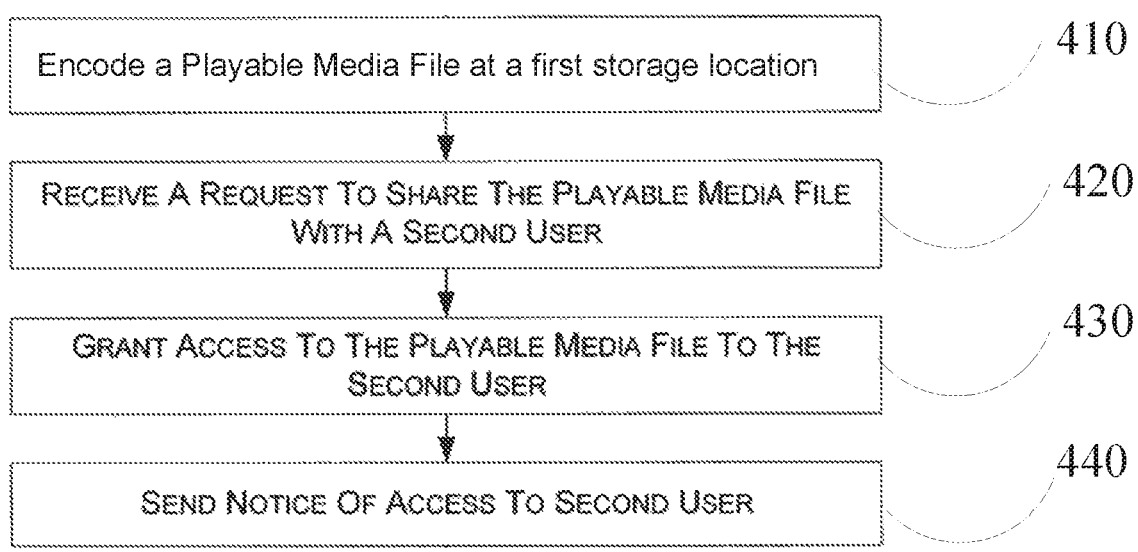
FIG. 4 is a flowchart of the method and/or process related to annotating Playable Media File within a social network.

In certain embodiments, the member creating the annotation can set permissions for the annotation, restricting who can view or edit the annotation. In such embodiments, the permissions are stored in permission file 157. Referring now to FIG. 4, in step 410 a first network user encodes a first Playable Media file in a first storage location. In step 420, the first user receives a request to share the first Playable Media File with a second network user. In step 430, the first network user grants access to the first Playable Media File to the requesting second network user. The first user's grant of access right to the second network user is encoded in a permission file 157. In step 440, the network server provides notice to the second network user regarding that second user's access privilege(s) to access the first Playable Media File from the first storage location. In certain embodiments the notice may further include a link to the Playable Media File or information about where and how to access the Playable Media File.

For those Playable Media Files having annotations, data profile 300 further contains information fields concerning each annotation 312(*a*)-(*n*), including one or more of the type 320 of the annotation (text, audio, video, picture, etc.), the location 322 of the associated annotation within the Playable Media File, the GUID 324 of the member who initiated the annotation, and a description 326 for the annotation, such as a title or other descriptor.

In certain embodiments Applicants' algorithm 136 further generates a table of contents of the annotations added to the Playable Media File using the information in data profile 300, including a link to each annotation. The link may be in the form of a pointer, electronic bookmark, hyperlink, or any other type of link. Where the link is a hyperlink, the hyperlink may link to an annotation that is saved as a different file on data storage library 160 or 170. In certain embodiments, annotation(s) may be viewed and edited separately from the Playable Media File. For each new annotation added to the Playable Media File, Applicants' algorithm 136 updates the table of contents. In such embodiments, the table of contents may include one or more of a caption or other description of the annotation, the time of the annotation within the Playable Media File, the author of the annotation, and the date and/or time the annotation was made.

FIG. 5 summarizes Applicants' method to save and share annotations associated with a Playable Media File. Referring now to FIG. 5, in step 510 the method encodes an annotation to be associated with a Playable Media File in a storage location, i.e. a file, that differs from the Playable Media File. In certain embodiments, step 510 is performed by Applicants' algorithm 136. In certain embodiments, step 510 is performed by the user creating the annotation.

In certain embodiments, the "visibility" for annotation saved in step 510 is by default defined as "public," meaning that any other user who has permission to stream the Playable Media File has permission to stream that "public" annotation. In step 520, Applicants' method determines whether to change that "visibility" from "public" to "private."

If the method elects in step 520 not to change the visibility from public to private, then the method transitions from step 520 to step 530 and includes a storage location for the saved annotation in a sitemap published to search engines. Applicants' method transitions from step 530 to step 570.

Alternatively, if the method elects in step 520 to change the visibility from public to private, then the method transitions from step 520 to step 540 and does not include a storage location for the saved annotation in a sitemap published to search engines. In certain embodiments, step 540 is performed by Applicants' network server 130. In certain embodiments, step 540 is performed by Applicants' algorithm 136.

Applicants' method transitions from step 540 to step 550 wherein the method determines whether to share the saved annotation to specific recipients. In certain embodiments, step 550 is performed by Applicants' network server 130. In certain embodiments, step 550 is performed by Applicants' algorithm 136.

If Applicants' method elects in step 550 to not share the annotation with specific recipients, then the method transitions from step 550 to step 570. Alternatively, if Applicants' method elects in step 550 to share the annotation with specific recipients, then the method transitions from step 550 to step 560 wherein the user to prompted to enters recipients in the form of name(s), and/or email address, and/or social media account. Applicants' method transitions from step 560 to step 570.

In step 570, the method determines if the annotation encoded in step 510 is the first annotation for the Playable Media File. If the method determines if the annotation saved in step 510 comprises a first annotation for the Playable Media File, then the method transitions to step 590 wherein a table of contents is created for the Playable Media File. Alternatively, if the annotation is not the first and the Playable Media File already has a table of contents, then the method transitions to step 580 wherein the method updates the table of contents to include an entry for the saved annotation of step 510. For example, upon receipt of an annotation from computing device 150 of the second user, network server 130 determines if the Playable Media. File already has annotations (and thus a table of contents) by checking annotations field 312 (FIG. 3) of data profile 300. If no annotations are included in the Playable Media File, the network server 130 creates a table of contents using the data in data profile 300 and the annotation and any related information received from computing device 150. In certain embodiments the table of contents is then saved separately from the Playable Media File. In certain embodiments, the table of contents is stored on Applicants' network server 130. In certain such embodiments, the table of contents is associated with the Playable Media File such that it is always presented to a user viewing the Playable Media File. In other embodiments, the table of contents may be viewed separately from the Playable Media File.

Figure 5A:
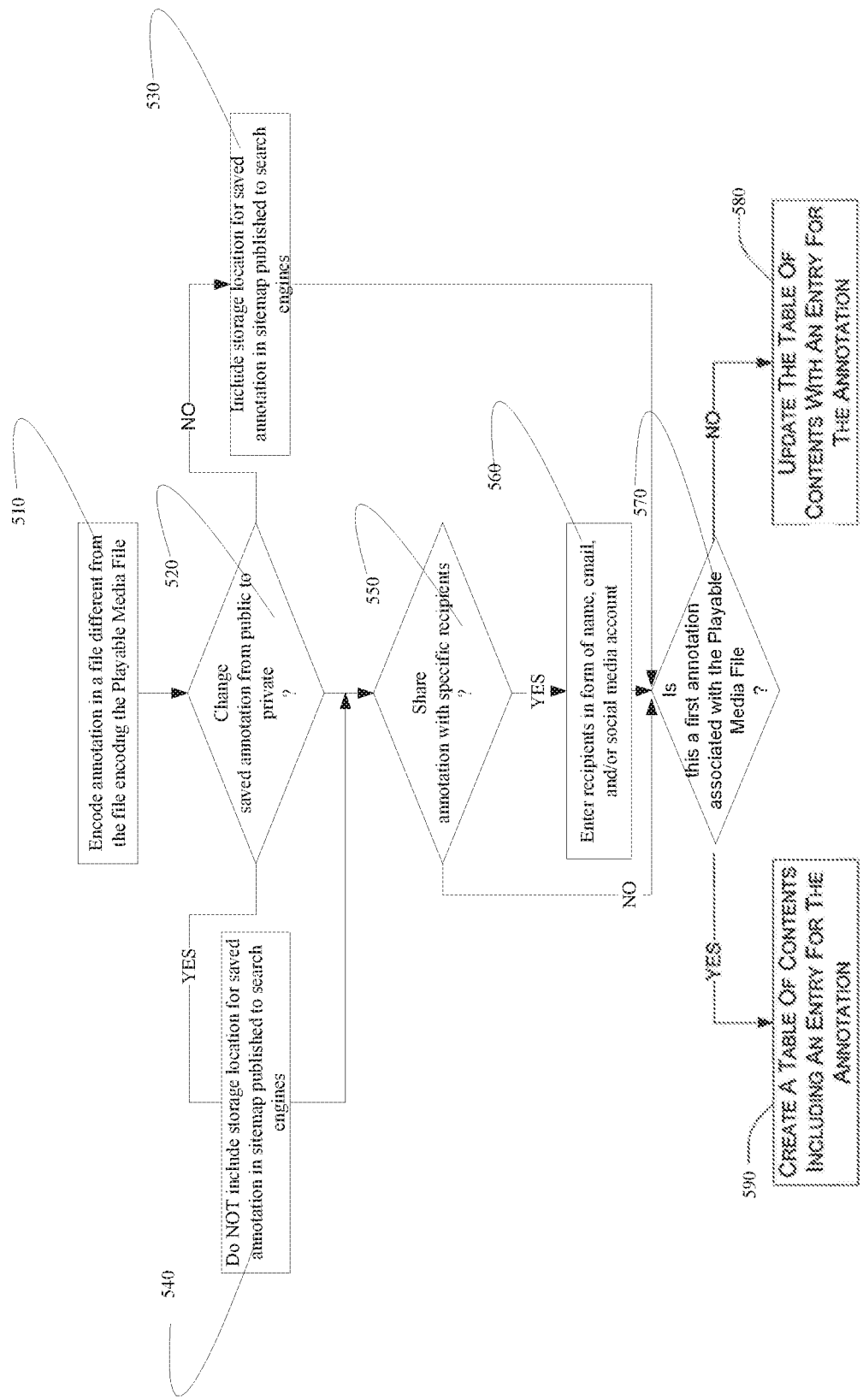
FIG. 5A summarizes additional steps in Applicants' method, additional steps implemented by Applicants' article of manufacture, and additional steps performed by a programmable processor implementing Applicants' computer program product.
Figure 5B:
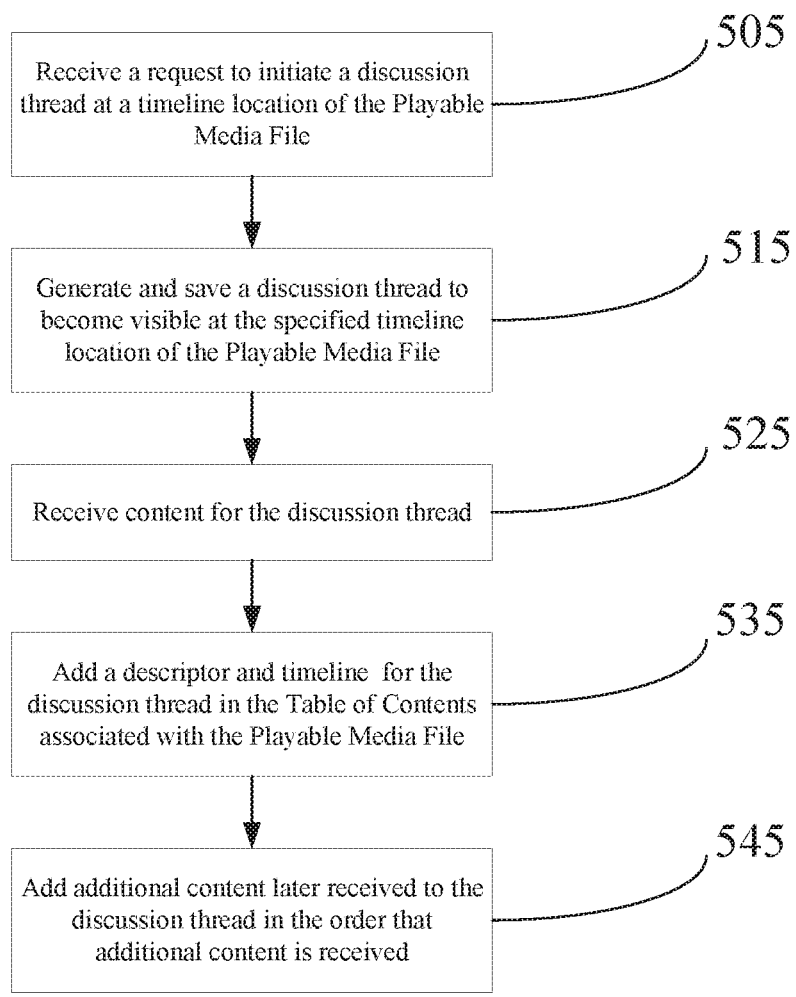
FIG. 5B summarizes additional steps in Applicants' method, additional steps implemented by Applicants' article of manufacture, and additional steps performed by a programmable processor implementing Applicants' computer program product.

Referring now to FIG. 5B, in certain embodiments, Applicants' method can initiate a discussion thread to be displayed at a specific timeline location of the Playable Media File. In step 505, Applicants' network server receives a request from a member to initiate a discussion thread at a specified timeline location in the Playable Media File. In step 515, Applicants' algorithm 136 generates the discussion thread to become visible when the Playable Media File is streamed and viewed at the timeline specified. In certain embodiments the request further includes a type identifier indicating whether the discussion thread is to be open or closed. Where the open identifier is provided, the discussion thread is open to all members and therefore any member may view and add a comment to the discussion thread. Where the closed identifier is provided, the discussion thread is private and only available to particular members. In such embodiments the request provided by the initiating member includes identifiers for one or more members that are to have access to the discussion thread. In certain such embodiments Applicants' algorithm 136 further sends invitations to the identified members to invite them to participate in the thread. In certain such embodiments, the permissions given to various members to access and participate in the discussion thread is stored in permissions file 157.

Members having access to the Playable Media File can then add written, audible, pictorial, or video comments to the thread. In step 525, Applicants' network server receives content for inclusion in the discussion thread. In step 535, Applicants' method adds a descriptor and a timeline for the discussion thread in a Table of Contents associated with the Playable Media File. In step 545, additional content for the discussion thread that is later received is added to the discussion thread in the order received. Further in step 545, a descriptor for that later-added content is added to the Table of Contents.

In certain embodiments only members having edit privileges can post in the discussion thread. In certain embodiments only individuals having specific discussion thread privileges can post in the discussion thread. In certain embodiments, the privilege to post in a thread is specific to the particular thread, and therefore a member may have access to post in one thread but not another. In certain embodiments, the discussion thread is visible to any individual viewing the Playable Media File. In other embodiments, the discussion thread is visible only to certain individuals, such as those that have been given specific access to the thread or those that have edit privileges for the video.

For Playable Media Files having discussion threads, data profile 300 further includes information fields for each discussion thread 328, including for each comment 330(*a*)-(*n*) made in the discussion thread by a member, the GLAD of the member author of the comment, and a description 334, which may be the comment itself or another identifier.

Applicants' further disclose an article of manufacture comprising a platform for information management, such as computing device 110, 130, and/or 150, comprising computer readable program code, such as API 116, API 156, and/or Applicants' social network source code 136, residing in a non-transitory computer readable medium, such as computer readable medium 113, 133, and/or 153, where that computer readable program code can be executed by a processor, such as processor 112 (FIG. 1) and/or 132 (FIG. 1), and/or 152, to implement Applicants' method recited in FIGS. 4, 5A, 5B, 6, 7, 8, 9, 10, and 11.

Applicants further disclose a non-transitory computer readable medium wherein Applicants' computer program product is encoded herein. Applicants' computer program product comprises computer readable program code that can be executed by a programmable processor to implement Applicants' method recited in FIGS. 4, 5A, 5B, 6, 7, 8, 9, 10, and 11. In either case, in certain embodiments, the computer readable program code is encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, FLASH PROM, compactflash, smartmedia, and the like.

Figure 6:
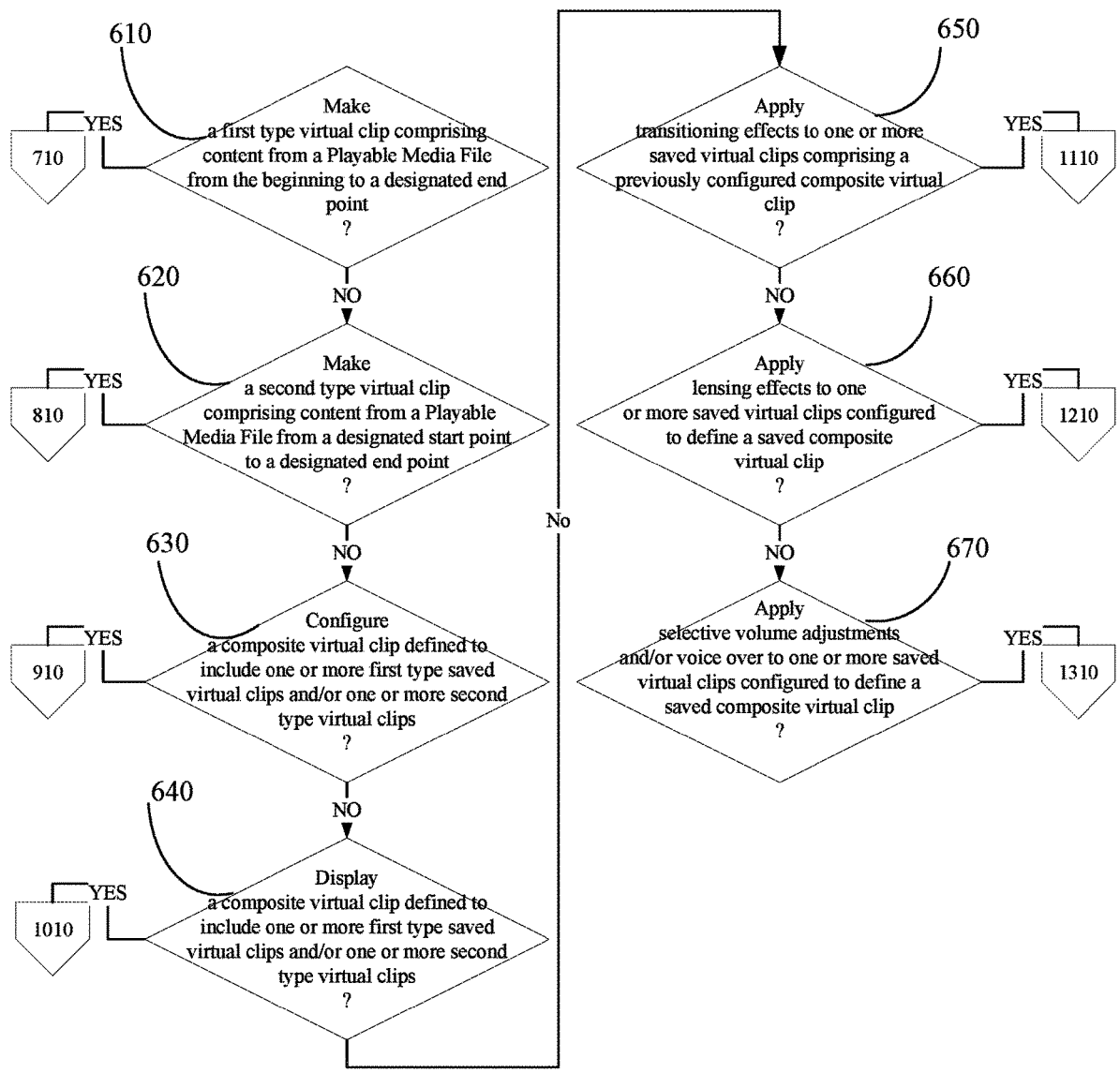
FIG. 6 summarizes additional steps in Applicants' method, additional steps implemented by Applicants' article of manufacture, and additional steps performed by a programmable processor implementing Applicants' computer program product.

Referring now to FIG. 6, in step 610 Applicants disclose determining whether to create a plurality of virtual clips, wherein each virtual clip comprises content encoded in one or more Media File, playable or static, from a beginning of the Media File, playable or static, up to a designated end point, wherein "Media File, playable or static," means a file selected from the group consisting of an audio file, a video file, an audiovisual file, slide show file, AVI file, MP3 file, MP4 file, WMA file, WAV file, FLASH, MPEG file, an image file (JPG, TIF, PNG, GIF, Bitmap, and the like), a PDF file, a text file, a VISIO file, a .ppt file, a .key file, a spreadsheet file, and any type of 3D media file. In certain embodiments, such a 3D media file requires holographic projection/holographic viewing. In certain embodiments, "Media File, playable or static," further includes any file which generates a Stereoscopic visual display that can be viewed through stereoscopic eyewear or played on 3D display technology such as 3D TV, and in certain embodiments comprises a Virtual Reality/Augmented Reality file that can be viewed through Virtual Reality devices such as HOLOLENS, OCULUS RIFT, SONY PLAYSTATION VR, HTC VIVE, RAZER OSBR HDK, ZEISS VR1, SOVTECH VR, FREEFLY, and the like.

Figure 7:
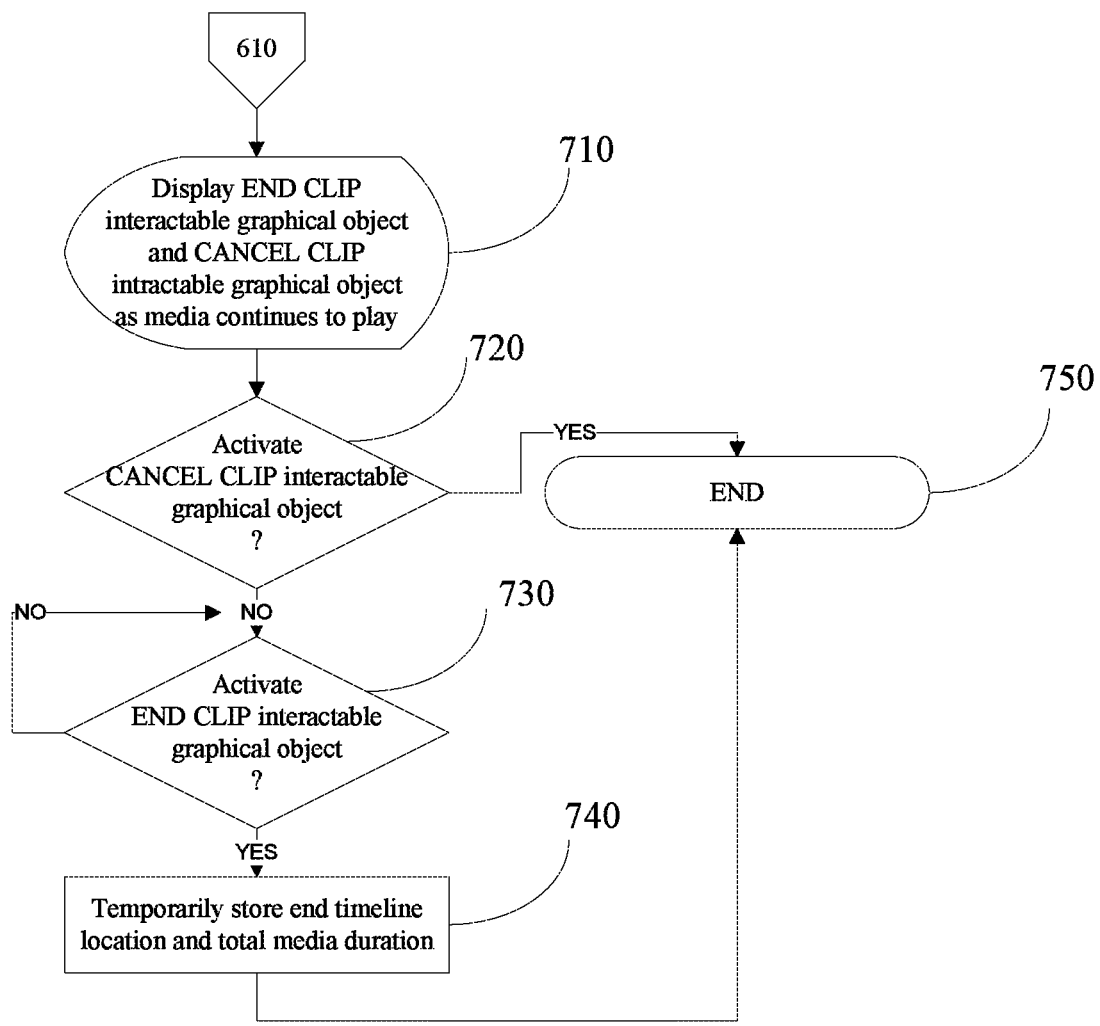
FIG. 7 summarizes additional steps in Applicants' method, additional steps implemented by Applicants' article of manufacture, and additional steps performed by a programmable processor implementing Applicants' computer program product.

If a user elects to create such a plurality of virtual clips, the method transitions from step 610 to step 710 (FIG. 7). Referring now to FIG. 7, in step 710 the method, without pausing the media play, displays an END CLIP interactable graphical object and a CANCEL CLIP interactable graphical object.

If the user activates the CANCEL CLIP interactable graphical object in step 720, then the method transitions from step 720 to step 750 and ends. Alternatively, if the user does not activate the CANCEL CLIP interactable graphical object in step 710, then the method transitions from step 710 to step 730 wherein the method determines if the END CLIP interactable graphical object has been activated. If the method determines in step 730 that the END CLIP interactable graphical object has not been activated, then the method pauses at step 730 until the user activates the END CLIP interactable graphical object, wherein the method transitions from step 730 to step 740 wherein the method temporarily stores a begin time, end time, and total media duration.

In certain embodiments, in step 740 an end timeline location, and the total media duration are saved to the user's computing device. In certain embodiments, in step 740 the begin time, the end time, and a total media duration are saved to Applicants' network server 130 (FIG. 1).

If the user elects in step 610 NOT to create a plurality of virtual clips each from a beginning to a designated end point, then the method transitions from step 610 to step 620 wherein the method may elect to create a plurality of virtual clips comprising content from one or more Media File, playable or static from a designated start point to a designated end point. If the user elects to create a plurality of virtual clips, where each virtual clip comprises content from one or more Media File, playable or statics, and wherein the user specifies a designated timeline location to begin the virtual clip, then the method transitions from step 620 to step 810 (FIG. 8).

Figure 8:
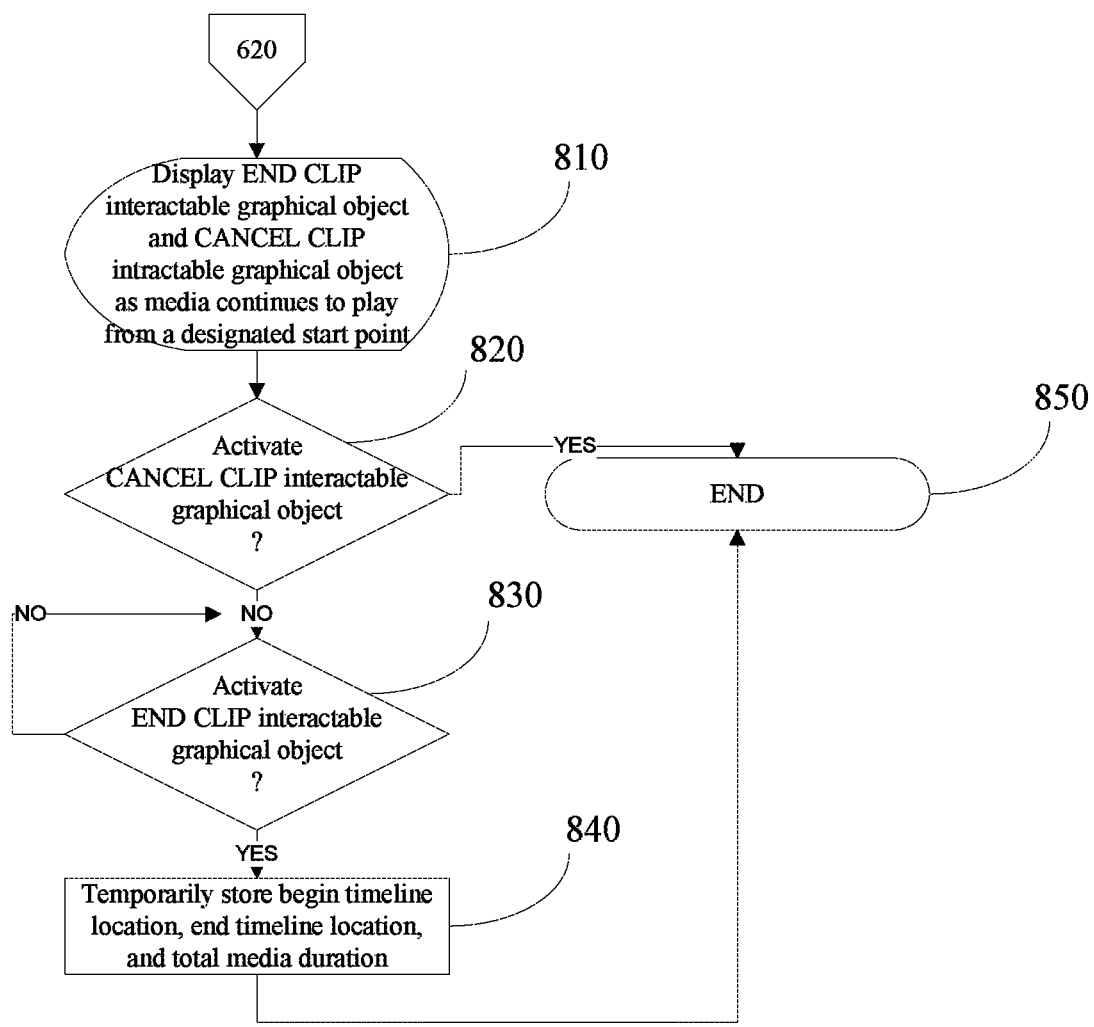
FIG. 8 summarizes additional steps in Applicants' method, additional steps implemented by Applicants' article of manufacture, and additional steps performed by a programmable processor implementing Applicants' computer program product.

Referring now to FIG. 8, in step 810 the method streams the Media File, playable or static from a designated start point, and without pausing the media play, displays an END CLIP interactable graphical object and a CANCEL CLIP interactable graphical object.

If the user activates the CANCEL CLIP interactable graphical object in step 820, then the method transitions from step 820 to step 850 and ends. Alternatively, if the user does not activate the CANCEL CLIP interactable graphical object in step 810, then the method transitions from step 810 to step 830 wherein the method determines if the END CLIP interactable graphical object has been activated. If the method determines in step 830 that the END CLIP interactable graphical object has not been activated, then the method pauses at step 830 until the user activates the END CLIP interactable graphical object, wherein the method transitions from step 830 to step 840 wherein the method temporarily stores a begin time, end time, and total media duration.

In certain embodiments, in step 740 a begin timeline location, an end timeline location, and the total media duration are saved to the user's computing device. In certain embodiments, in step 740 the begin time, the end time, and a total media duration are saved to Applicants' network server 130 (FIG. 1).

If the user elects in step 610 NOT to create a plurality of virtual clips each from a beginning to a designated end point, and if the user elects NOT to create a plurality of virtual clips, where each virtual clip comprises content from one or more Media File, playable or statics, and wherein the user specifies a designated timeline location to begin the virtual clip, then the method transitions from step 620 to step 630 wherein the method determines if the user elects to configure a composite virtual clip.

Figure 9:
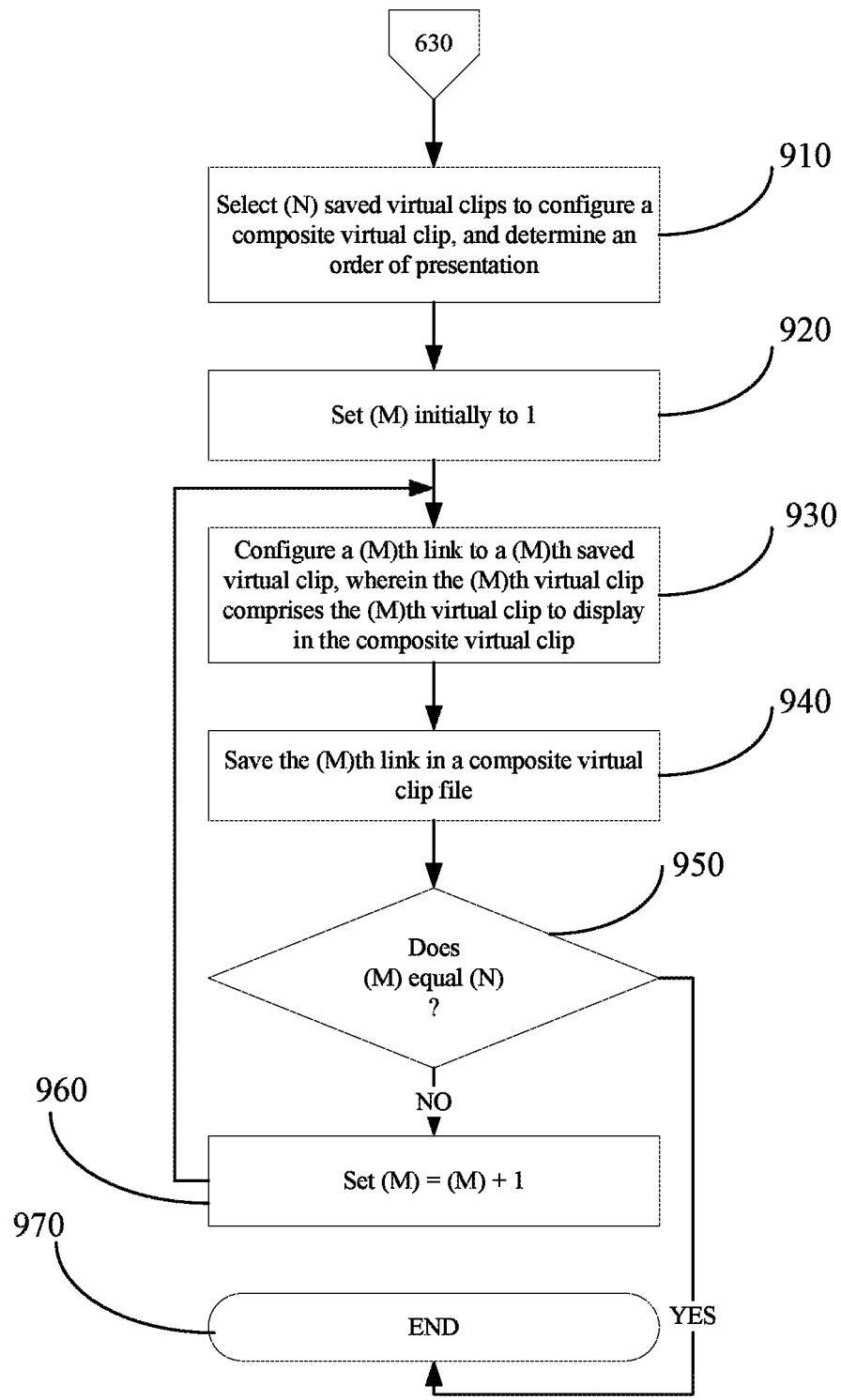
FIG. 9 summarizes additional steps in Applicants' method, additional steps implemented by Applicants' article of manufacture, and additional steps performed by a programmable processor implementing Applicants' computer program product.
Figure 10:
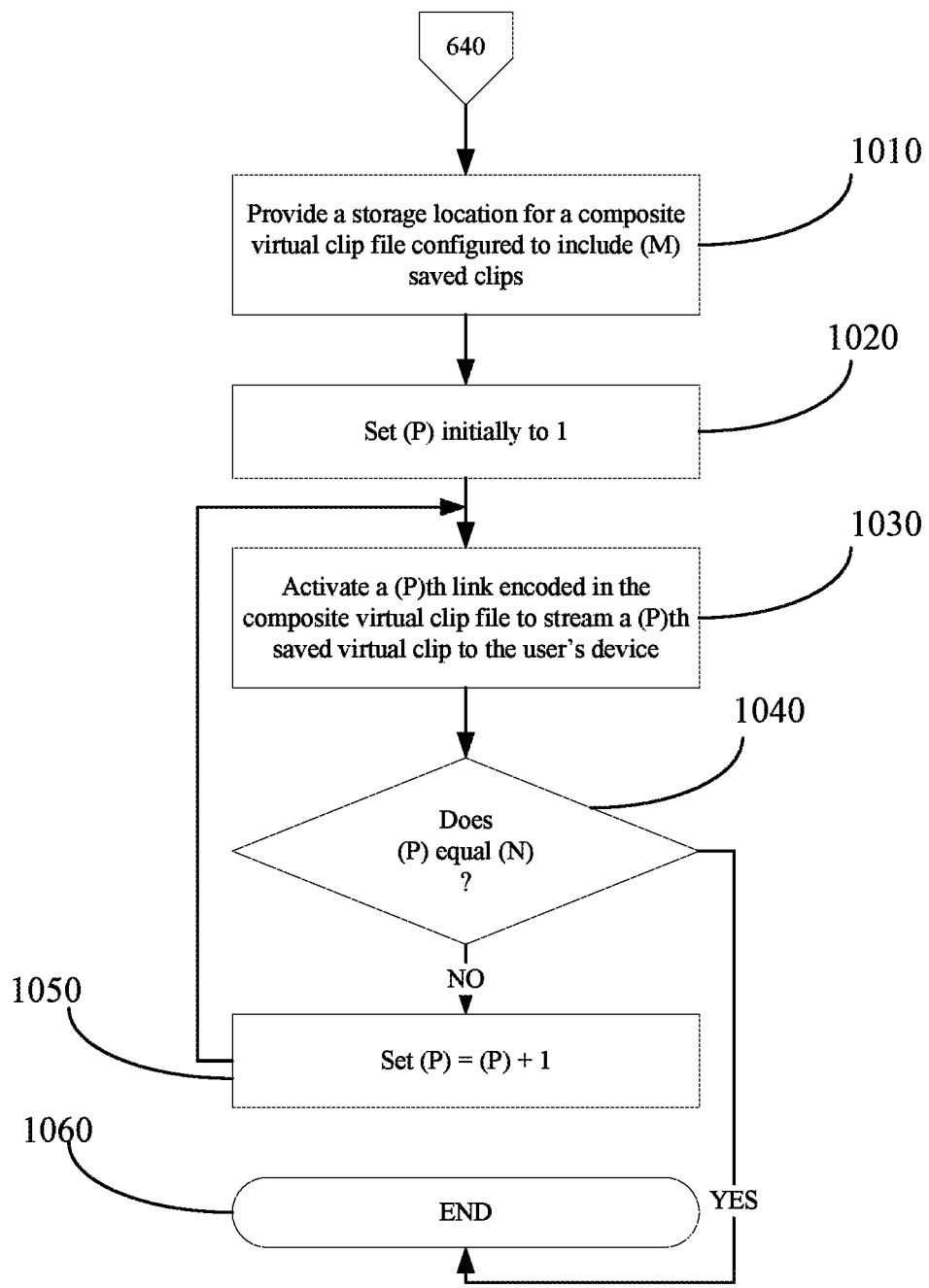
FIG. 10 summarizes additional steps in Applicants' method, additional steps implemented by Applicants' article of manufacture, and additional steps performed by a programmable processor implementing Applicants' computer program product.

If the user elects to configure a composite virtual clip in step 630, the method transitions from step 630 to step 910. Referring now to FIG. 9, in step 910 the method selects (N) saved virtual clips to configure a composite virtual clip, and determines an order of presentation for those (N) virtual clips.

In step 920, the method sets (M) initially to 1. In step 930, the method configures a (M)th link to a (M)th saved virtual clip, wherein the (M)th saved virtual clip will be the (M)th virtual clip to be displayed when the composite virtual clip is activated. In step 930, the method saves the (M)th link in a composite virtual clip file.

In step 950, the method determines if (114) equals (N), i.e. if all (N) links to the (N) selected (N) saved virtual clips have been created and saved. If the method determines in step 950 that (M) does not equal (N), then the method transitions from step 950 to step 960 wherein the method increments (M) by 1, i.e. sets (M) equal to (M)+1. The method transitions from step 960 to step 930 and continues as described herein. Alternatively, if the method determines in step 950 that (M) equals (N), then the method transitions from step 950 to step 970 and ends.

If the user elects in step 610 NOT to create a plurality of virtual clips each from a beginning to a designated end point, and if the user elects in step 620 NOT to create a plurality of virtual clips, where each virtual clip comprises content from one or more Media File, playable or statics, and wherein the user specifies a designated timeline location to begin the virtual clip, and if the user does NOT elect in step 630 to configure a composite virtual clip in step 630, then in step 640 the method determines whether to display a composite virtual clip.

If the user elects to display a composite virtual clip in step 640, the method transitions to step 1010 where the method provides a storage location for a composite virtual clip file configured to access (M) saved clips. In step 1020, the method sets (P) initially to 1. In step 1030 the method activates a (P)th link encoded in the composite virtual clip file to stream a (P)th saved virtual clip to the user's device.

In step 1040 the method determines if all (N) clips comprising the selected composite virtual clip have been displayed, i.e. if (P) equals (N). If the method determines in step 1040 that (P) does not equal (N), then the method transitions from step 1040 to step 1050 and increments (P) by 1, i.e. sets (P) equal to (P)+1. The method transitions from step 1050 to step 1030 and continues as described herein. Alternatively, if the method determines in step 1040 that (P) equals (N), the method transitions to step 1060 and ends.

If a user elects in step 650 to apply one or more transitioning effect to one or more saved virtual clips, then the method transitions from step 650 to step 1110. As those skilled in the art will appreciate, a "transition" comprises an animation-like effect when Applicants' method to display a composite virtual clip moves from one previously saved virtual clip to a next previously saved virtual clip during an on-screen presentation. Applicants' method allows control the speed of each transition effect. In addition, Applicants' method also permits the addition of sound transitions when moving from a saved virtual clip to the next saved virtual clip.

Figure 11:
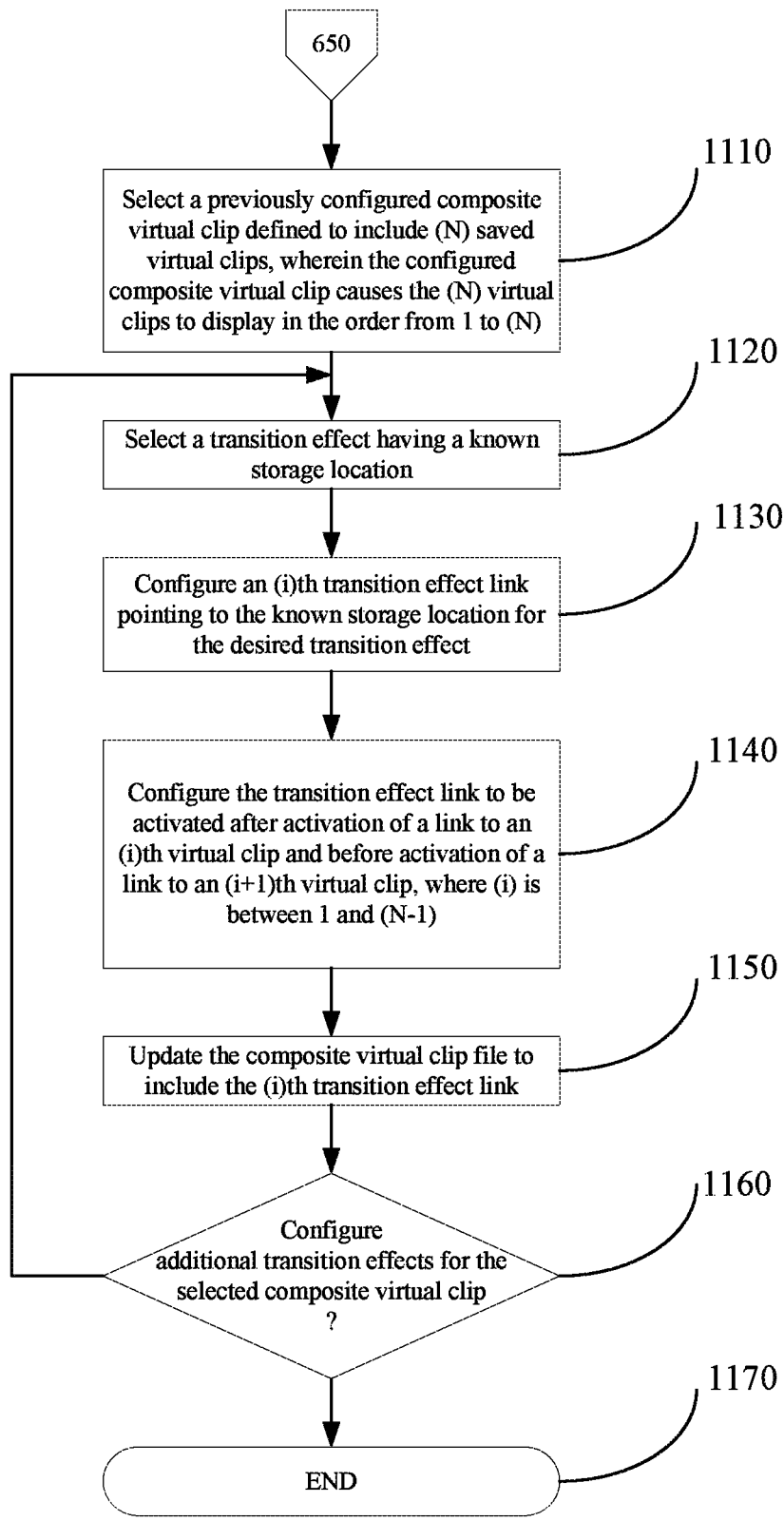
FIG. 11 summarizes additional steps in Applicants' method, additional steps implemented by Applicants' article of manufacture, and additional steps performed by a programmable processor implementing Applicants' computer program product.

If a user desires in step 650 to add one or more transition effects to a previously configured composite virtual clip, Applicants' method transitions from step 650 to step 1110 (FIG. 11). Referring now to FIG. 11, in step 1110 the method selects a previously configured composite virtual clip, wherein that composite virtual clip is configured to include (N) previously saved virtual clips in an order from 1 to (N).

In step 1120, the method selects a transition effect having a known storage location. In step 1130, the method configures an (i)th transition effect link pointing to the known storage location for the desired transition effect.

In step 1140, the method configures the (i)th transition effect link to be activated after activation of a link to an (i)th virtual clip and before activation of a link to an (i+1)th virtual clip. In step 1150, the method updates the composite virtual clip file to include the (i)th transition effect link.

In step 1160, the method determines if the user desires to configure additional transition effects for the selected composite virtual clip. If the user elects to configure additional transition effect links, then the method transition from step 1160 to step 1120 and continues as described herein. Alternatively, if the user does not elect to configure additional transition effect links, then the method transition from step 1160 to step 1170 and ends.

If a user desires in step 660 to add one or more lensing effects to a previously configured composite virtual clip, Applicants' method transitions from step 660 to step 1210 (FIG. 12) As those skilled in the art will appreciate, a "lensing" effect includes, for example and without limitation, overlay of one or more color filters, image distortions, and annotations.

Figure 12:
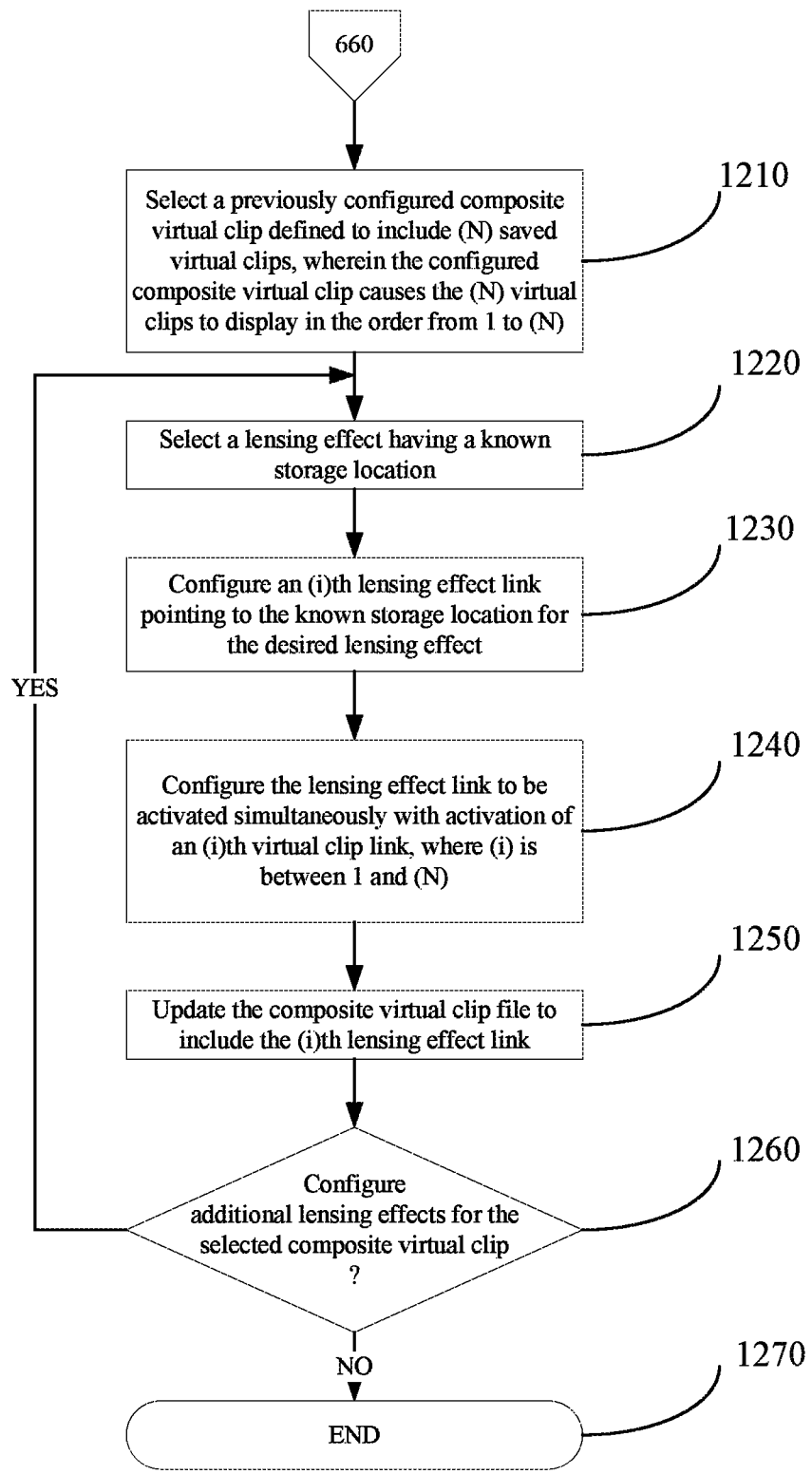
FIG. 12 summarizes additional steps in Applicants' method, additional steps implemented by Applicants' article of manufacture, and additional steps performed by a programmable processor implementing Applicants' computer program product.

Referring now to FIG. 12, in step 1210 the method selects a previously configured composite virtual clip, wherein that composite virtual clip is configured to include (N) previously saved virtual clips in an order from 1 to (N).

In step 1220, the method selects a lensing effect having a known storage location. In step 1230, the method configures an (i)th lensing effect link pointing to the known storage location for the desired lensing effect.

In step 1240, the method configures the (i)th lensing effect link to be simultaneously with activation of a link to an (i)th virtual clip. In step 1250, the method updates the composite virtual clip file to include the (i)th lensing effect link.

In step 1260, the method determines if the user desires to configure additional lensing effects for the selected composite virtual clip. If the user elects to configure additional transition effect links, then the method transition from step 1260 to step 1220 and continues as described herein. Alternatively, if the user does not elect to configure additional transition effect links, then the method transition from step 1260 to step 1270 and ends.

Figure 13:
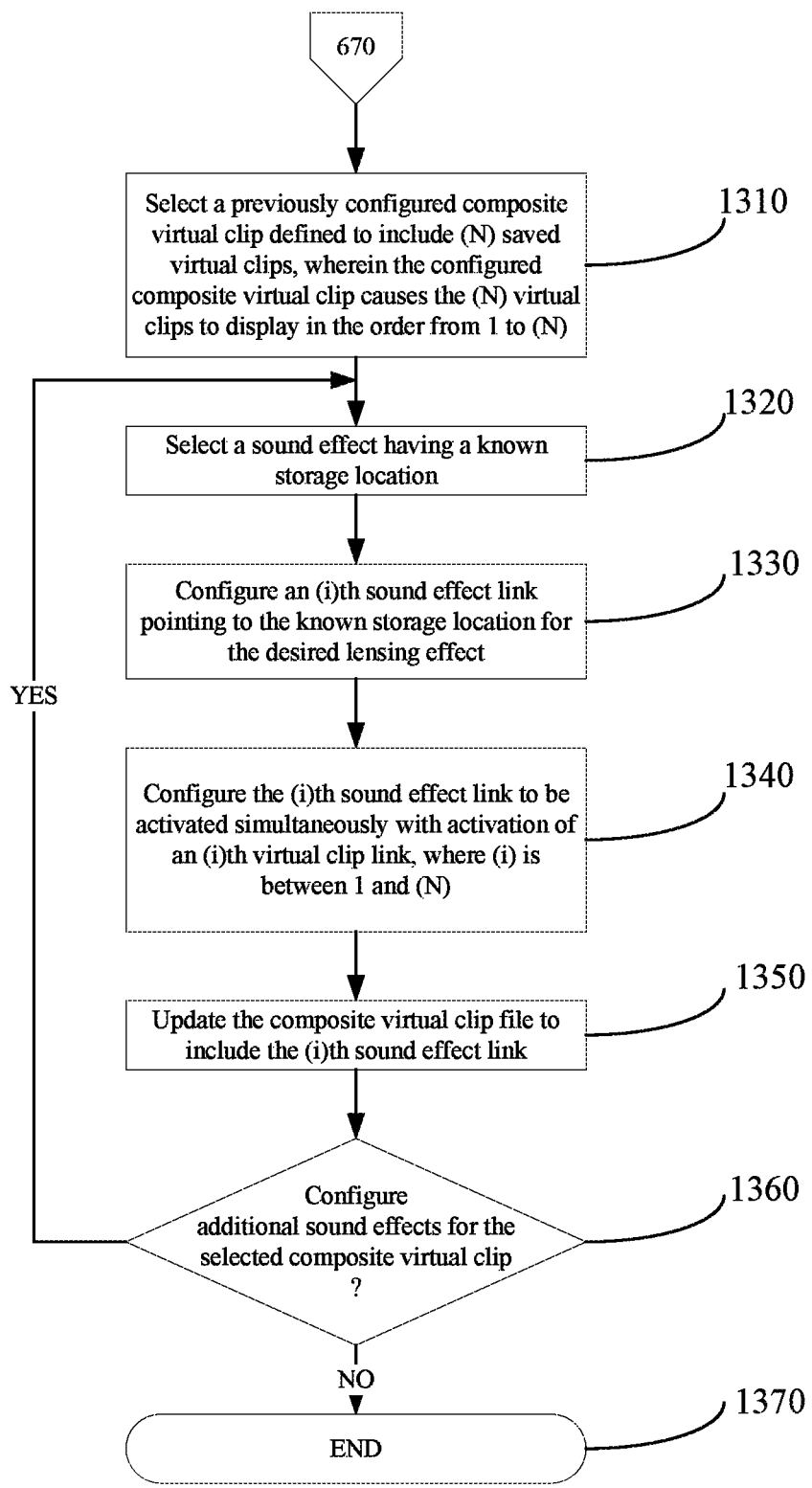
FIG. 13 summarizes additional steps in Applicants' method, additional steps implemented by Applicants' article of manufacture, and additional steps performed by a programmable processor implementing Applicants' computer program product.

If a user desires in step 670 to add one or more sound effects to a previously configured composite virtual clip, Applicants' method transitions from step 670 to step 1310 (FIG. 13). Referring now to FIG. 13, in step 1310 the method selects a previously configured composite virtual clip, wherein that composite virtual clip is configured to include (N) previously saved virtual clips in an order from 1 to (N).

In step 1320, the method selects a sound effect having a known storage location. In step 1330, the method configures an (i)th sound effect link pointing to the known storage location for the desired lensing effect.

In step 1340, the method configures the (i)th sound effect link to be simultaneously with activation of a link to an (i)th virtual clip. In step 1350, the method updates the composite virtual clip file to include the (i)th sound effect link.

In step 1360, the method determines if the user desires to configure additional sound effects for the selected composite virtual clip. If the user elects to configure additional sound effect links, then the method transition from step 1360 to step 1320 and continues as described herein. Alternatively, if the user does not elect to configure additional sound effect links, then the method transition from step 1360 to step 1370 and ends.

While the preferred embodiments of the present invention have been illustrated in detail, it should be apparent that modifications and adaptations to those embodiments may occur to one skilled in the art without departing from the scope of the present invention as set forth herein.

We claim:

1. A method to make a composite virtual clip, comprising:
    selecting (N) saved virtual clips and an order of presentation for each virtual clip;
    initially setting (M)=1;
    configuring a (M)th pointer to indicate a storage location for a (M)th saved virtual clip, wherein a (M)th virtual clip comprises a (M)th content from one or more designated sources and (M) is greater than or equal to 1 and less than or equal to (N);
    saving said (M)th pointer;
    determining if (M) equals (N);
    when (M) is less than (N), setting (M) equal to (M)+1; and
    repeating said configuring, saving, and determining until (M) equals (N).

2. The method of claim 1, wherein said composite virtual clip further comprises one or more first type virtual clips, wherein the one or more first type virtual clips comprise content from a Media File, playable or static, from a beginning to a first designated end point, wherein the Media File, playable or static, is selected from the group consisting of AVI file, MP3 file, MP4 file, WMA file, WAV file, FLASH, MPEG file, an image file, a PDF file, a text file, a VISIO file, a .ppt file, a .key file, a spreadsheet file, 3D media file which provides a Stereoscopic visual display that can be viewed through stereoscopic eyewear or played on 3D display technology, and a Virtual Reality/Augmented Reality file that can be viewed through Virtual Reality devices.

3. The method of claim 2, further comprising:
    displaying a first interactable graphical object, wherein the first interactable graphical object comprises a Cancel Clip link;

simultaneously displaying a second interactable graphical object, wherein the second interactable graphical object comprises an End Clip link;

when activating the first interactable graphical object, a begin time location, end time location, and first media duration of the first type virtual clip are not stored; and when activating the second interactable graphical object, the begin time location, end time location, and first media during of the first type virtual clip are stored.

4. The method of claim 1, wherein said composite virtual clip further comprises one or more second type virtual clips, wherein the second type virtual clip comprising content from a Media File, playable or static, from a designated beginning to a second designated end point, wherein said Media File, playable or static, is selected from the group consisting of an AVI file, MP3 file, MP4 file, WMA file, WAV file, FLASH, MPEG file, an image file, a PDF file, a text file, a .ppt file, a .key file, a VISIO file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

5. The method of claim 4, further comprising:

displaying a first interactable graphical object, wherein the first interactable graphical object comprises a Cancel Clip link;

simultaneously displaying a second interactable graphical object, wherein the second interactable graphical object comprises an End Clip link;

when activating the first interactable graphical object, a begin time location, end time location, and first media duration of the second type virtual clip are not stored; and when activating the second interactable graphical object, the begin time location, end time location, and first media during of the second type virtual clip are stored.

6. The method of claim 1, wherein said composite virtual clip further comprises one or more first type virtual clips and one or more second type virtual clips.

7. A method to display a composite virtual clip, comprising:

providing a storage location for a composite virtual clip stored in a composite virtual clip file, wherein the composite virtual clip is configured to access (N) saved virtual clips;

initially setting (P)=1;

activating a (P)th link encoded in the composite virtual clip file to stream a (P)th saved virtual clip to a user's device;

determining if (P) equals (N);

when (P) is less than (N), setting (P) equals (P)+1; and repeating said activating and determining until (P) equals (N).

8. The method of claim 7, wherein said composite virtual clip further comprises one or more first type virtual clips, wherein the first type virtual clip comprising content from a Media File, playable or static from a beginning to a first designated end point, wherein said Media File, static or playable, is selected from the group consisting of an AVI file, MP3 file, MP4 file, WMA file, WAV file, FLASH, MPEG file, an image file, a PDF file, a text file, a VISIO file, a .ppt file, a .key file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

9. The method of claim 7, wherein said composite virtual clip further comprises one or more second type virtual clips, wherein the second type virtual clip comprising content from a Media File, playable or static from a designated start point to a second designated end point, wherein said Media File, static or playable, is selected from the group consisting of an AVI file, MP3 file, MP4 file, WMA file, WAV file, FLASH, MPEG file, an image file, a PDF file, a text file, a .ppt file, a .key file, a VISIO file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

10. The method of claim 7, wherein said composite virtual clip further comprises one or more first type virtual clips and one or more second type virtual clips.

11. The method of claim 7, further comprising adding a transition effect to the composite virtual clip by:

selecting the composite virtual clip, wherein the composite virtual clip is defined by (N) saved virtual clips and an order of presentation of each virtual clip from 1 to N;

selecting a transition effect having a known storage location;

initially setting (i)=1;

configuring an (i)th transition effect link pointing to a known (i)th transition effect storage location;

configuring the (i)th transition effect link to be activated after activating an (i)th virtual clip link and before activation of an (i+1)th virtual clip link, wherein (i) is between 1 and (N)−1;

updating the composite virtual clip file to include the (i)th transition effect link;

determining if (i) equals (N);

when (i) is less than (N), setting (i) equals (i)+(1); and repeating selecting and configuring to add the (i)th transition effect to the composite virtual clip until (i) equals (N)−1.

12. The method of claim 7, further comprising adding an effect to the composite virtual clip, wherein the effect includes at least one of a lensing effect and a second effect, by:

selecting the composite virtual clip, wherein the composite virtual clip defined by (N) saved virtual clips and an order of presentation of each virtual clip from 1 to N;

selecting an effect having a known storage location;

setting (k) initially equals to 1;

configuring an (k)th effect link pointing to a known (k)th storage location;

configuring the (k)th effect link to be activated simultaneously with an (k)th virtual clip, wherein (k) is between 1 and (N);

updating the composite virtual clip to include the (k)th effect link;

determining if (k) equals (N);

when (k) is less than (N), setting (k) equals (k)+(1); and repeating selecting and configuring to add the (k)th effect to the composite virtual clip until (k) equals (N).

13. A non-transitory computer usable medium encoded with a computer program product to make a composite virtual clip and usable with programmable computer processor disposed within a controller, comprising:

computer readable program code which causes said programmable computer processor to select (N) saved virtual clips and an order of presentation for each virtual clip;

computer readable program code which causes said programmable computer processor to initially set (M)=1;
computer readable program code which causes said programmable computer processor to configure a (M)th pointer to indicate a storage location for a (M)th saved virtual clip, wherein a (M)th virtual clip comprises a (M)th content from one or more designated sources and (M) is greater than or equal to 1 and less than or equal to (N);
computer readable program code which causes said programmable computer processor to save said (M)th pointer;
computer readable program code which causes said programmable computer processor to determine if (M) equals (N);
when (M) is less than (N), computer readable program code which causes said programmable computer processor to set (M) equal to (M)+1; and
computer readable program code which causes said programmable computer processor to repeat said configuring, saving, and determining until (M) equals (N).

14. The computer program product of claim 13, wherein said composite virtual clip further comprises one or more first type virtual clips, wherein the first type virtual clip comprises content from a Media File, playable or static from a beginning to a first designated end point, wherein said Media File, static or playable, is selected from the group consisting of an AVI file, MP3 file, MP4 file, WMA file, WAV file, FLASH, MPEG file, an image file, a PDF file, a text file, a .ppt file, a .key file, a VISIO file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

15. The computer program product of claim 14, further comprising computer readable program code which causes said programmable computer processor to:
display a first interactable graphical object, wherein the first interactable graphical object comprises a Cancel Clip link;
simultaneously display a second interactable graphical object a, wherein the second interactable graphical object comprises an End Clip link;
when activating the first interactable graphical object, not to store a begin time location, end time location, and first media duration of the first type virtual clip; and
when activating the second interactable graphical object, store the begin time location, end time location, and first media during of the first type virtual clip.

16. The computer program product of claim 13, wherein said composite virtual clip further comprises one or more second type virtual clips, wherein the second type virtual clip comprising content from a Media File, playable or static from a designated beginning to a second designated end point, wherein said Media File, static or playable, is selected from the group consisting of an AVI file, MP3 file, MP4 file, WMA file, WAV file, FLASH, MPEG file, an image file, a PDF file, a .ppt file, a .key file, a text file, a VISIO file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

17. The computer program product of claim 16, further comprising computer readable program code which causes said programmable computer processor to:
display a first interactable graphical object, wherein the first interactable graphical object comprises a Cancel Clip link;
simultaneously display a second interactable graphical object, wherein the second interactable graphical object comprises an End Clip link;
when activating the first interactable graphical object, not to store a begin time location, end time location, and first media duration of the second type virtual clip; and
when activating the second interactable graphical object, store the begin time location, end time location, and first media during of the second type virtual clip.

18. The computer program product of claim 13, wherein said composite virtual clip further comprises one or more first type virtual clips and one or more second type virtual clips.

19. A non-transitory computer usable medium encoded with a computer program product to display a composite virtual clip and usable with programmable computer processor disposed within a controller, comprising:
computer readable program code which causes said programmable computer processor to provide a storage location for a composite virtual clip stored in a composite virtual clip file, wherein the composite virtual clip is configured to access (N) saved virtual clips;
computer readable program code which causes said programmable computer processor to initially set (P)=1;
computer readable program code which causes said programmable computer processor to activate a (P)th link encoded in the composite virtual clip file to stream a (P)th saved virtual clip to a user's device;
computer readable program code which causes said programmable computer processor to determine if (P) equals (N);
when (P) is less than (N), computer readable program code which causes said programmable computer processor to set (P) equals (P)+1; and
computer readable program code which causes said programmable computer processor to repeat said activating and determining until (P) equals (N).

20. The computer program product of claim 19, wherein said composite virtual clip further comprises one or more first type virtual clips, wherein the first type virtual clip comprising content from a Media File, playable or static from a beginning to a first designated end point, wherein said Media File, static or playable, is selected from the group consisting of an AVI file, MP3 file, MP4 file, WMA file, WAV file, FLASH, MPEG file, an image file, a PDF file, a text file, a .ppt file, a .key file, a VISIO file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

21. The computer program product of claim 19, wherein said composite virtual clip further comprises one or more second type virtual clips, wherein the second type virtual clip comprising content from a Media File, playable or static from a designated start point to a second designated end point, wherein said Media File, static or playable, is selected from the group consisting of an AVI file, MP3 file, MP4 file, WMA file, WAV file, FLASH, MPEG file, an image file, a PDF file, a text file, a .ppt file, a .key file, a VISIO file, a spreadsheet file, a 3D media file which provides a Stereoscopic visual display that can be viewed through stereoscopic eyewear or played on 3D display technology, and a Virtual Reality/Augmented Reality file that can be viewed through Virtual Reality devices.

22. The computer program product of claim 19, wherein said composite virtual clip further comprises one or more first type virtual clips and one or more second type virtual clips.

23. The computer program product of claim 19, further comprising computer readable program code encoded with a computer program product to add a transition effect to the composite virtual clip and usable with programmable computer processor disposed within a controller, comprising:
   computer readable program code which causes said programmable computer processor to select the composite virtual clip, wherein the composite virtual clip is defined by (N) saved virtual clips and an order of presentation of each virtual clip from 1 to N;
   computer readable program code which causes said programmable computer processor to select a transition effect having a known storage location;
   computer readable program code which causes said programmable computer processor to initially set (i)=1;
   computer readable program code which causes said programmable computer processor to configure an (i)th transition effect link pointing to a known (i)th transition effect storage location;
   computer readable program code which causes said programmable computer processor to configure the (i)th transition effect link to be activated after activating an (i)th virtual clip link and before activation of an (i+1)th virtual clip, link wherein (i) is between 1 and (N)−1;
   computer readable program code which causes said programmable computer processor to update the composite virtual clip file o include the (i)th transition effect link;
   computer readable program code which causes said programmable computer processor to determine if (i) equals (N);
   when (i) is less than (N), computer readable program code which causes said programmable computer processor to set (i) equals (i)+(1); and
   computer readable program code which causes said programmable computer processor to repeat selecting and configuring to add the (i)th transition effect to the composite virtual clip until (i) equals (N).

24. The computer program product of claim 19, further comprising computer readable program code encoded with a computer program product to add an effect including at least one of a lensing effect and a sound effect to the composite virtual clip and usable with programmable computer processor disposed within a controller, comprising:
   computer readable program code which causes said programmable computer processor to select the composite virtual clip, wherein the composite virtual clip includes (N) saved virtual clips and an order of presentation of each virtual clip from 1 to N;
   computer readable program code which causes said programmable computer processor to select an effect having a known storage location;
   computer readable program code which causes said programmable computer processor to set (k) initially equals to 1;
   computer readable program code which causes said programmable computer processor to configure an (k)th effect link pointing to the known (k)th storage location;
   computer readable program code which causes said programmable computer processor to configure the (k)th effect link to be activated simultaneously with an (k)th virtual clip, wherein (i) is between 1 and (N);
   computer readable program code which causes said programmable computer processor to update the composite virtual clip to include the (k)th effect link;
   computer readable program code which causes said programmable computer processor to determine if (k) equals (N);
   when (k) is less than (N), computer readable program code which causes said programmable computer processor to set (k) equals (k)+(1); and
   computer readable program code which causes said programmable computer processor to repeat selecting and configuring to add the (k)th effect to the composite virtual clip until (k) equals (N).

* * * * *